(12) United States Patent
Stump et al.

(10) Patent No.: US 8,442,515 B2
(45) Date of Patent: May 14, 2013

(54) MANAGEMENT SYSTEM FOR MONITORING AND CONTROLLING REMOTE SITES AND EQUIPMENT

(75) Inventors: Benjamin Stump, Kendall Park, NJ (US); Matthew Izzo, Little Silver, NJ (US); Charles E. Kirkendall, III, Wilmington, OH (US); Jeffrey T. Harris, Dublin, OH (US); Joel M. Tamkin, Westerville, OH (US); Kyle Jordon, Circleville, OH (US); Kenneth D. Huffman, Hilliard, OH (US); David P. Abraham, Hilliard, OH (US)

(73) Assignee: Kentrox, Inc., Dublin, OH (US)

( * ) Notice: Subject to any disclaimer, the term of this patent is extended or adjusted under 35 U.S.C. 154(b) by 290 days.

(21) Appl. No.: 12/950,265

(22) Filed: Nov. 19, 2010

(65) Prior Publication Data

US 2011/0230182 A1 Sep. 22, 2011

Related U.S. Application Data

(60) Provisional application No. 61/262,575, filed on Nov. 19, 2009.

(51) Int. Cl.
*H04W 24/00* (2009.01)
(52) U.S. Cl.
USPC .......................................... 455/423; 340/540

(58) Field of Classification Search ... 455/423; 345/335; 340/540
See application file for complete search history.

(56) References Cited

U.S. PATENT DOCUMENTS

| | | | | |
|---|---|---|---|---|
| 6,008,805 A | * | 12/1999 | Land et al. | 715/744 |
| 7,299,277 B1 | * | 11/2007 | Moran et al. | 709/224 |
| 7,430,401 B2 | * | 9/2008 | Rajala | 455/67.7 |
| 8,155,105 B2 | * | 4/2012 | Reibel et al. | 370/350 |
| 2003/0162539 A1 | * | 8/2003 | Fiut et al. | 455/424 |
| 2006/0238339 A1 | * | 10/2006 | Primm et al. | 340/540 |

\* cited by examiner

*Primary Examiner* — Wesley Kim
*Assistant Examiner* — Joseph Dean, Jr.
(74) *Attorney, Agent, or Firm* — Porter, Wright, Morris & Arthur, LLP (57) ABSTRACT

A monitoring unit for a remote site includes a processor and memory configured to receive definitions of measurements and alarms to be collected at the remote site and to store the definitions of the measurements and alarms, a plurality of port connectors for communicating the processor with downstream collection devices that collect the measurements and alarms at the remote site, and a communication system for reporting the collected measurements and alarms to upstream systems. The definitions for the alarms and measurements can be provided from the port connections, stored script processes, and SNMP proxy. The memory is configured to automatically store a history of the measurements and alarms collected which can be exported to the upstream systems. The processor is configured to collect derived measurements not directly collected from the downstream collection devices.

17 Claims, 8 Drawing Sheets

```
ID - 0/3
Description - external temperature sensor
Resource State - assigned
State - enable
Low Band - 65
High Band - 80
Hysteresis - 2
Interval - 0
Max Current Loop - 20
Min Current Loop - 4
Max Sensor Reading - 130
Min Sensor Reading - -30
Units - Degrees F
Mode - current
Averaging - high
Value - 64.3 Degrees
```

FIG. 5

```
config discrete analog 0/3 description external temperature sensor
config discrete analog 0/3 band 65 80
config discrete analog 0/3 hysteresis 2
config discrete analog 0/3 current
config discrete analog 0/3 maximum 20 130
config discrete analog 0/3 minimum 4 -30
config discrete analog 0/3 units Degrees F
config discrete analog 0/3 enable
config alarm-entry analog0_3 event analog 0/3 high major High temp
$(value)
config alarm-entry analog0_3 event analog 0/3 low major Low temp
$(value)
config alarm-entry analog0_3 event analog 0/3 in-band normal Temp
In-Band $(value)
config alarm-entry analog0_3 event analog 0/3 input-saturated
critical Input Saturated
config alarm-entry analog0_3 event analog 0/3 Loss-of-signal
critical Loss of Signal config alarm-entry analog0_3 trap enable
```

Kentrox

Optima management Portal

Multiple Events Have Arrived or Been Cleared

[Print]

| Measurement Name | NE Name | Category | Description | Providing NE |
|---|---|---|---|---|
| HPM_Battery_Voltage | | | Battery Voltage | Berwick Remote |
| HPM_EST_Time_To_EoD | | | Remaining Battery Dis. | Berwick Remote |
| HPM_Battery_Percent_Charged | | | Battery Charge % | Berwick Remote |
| HPM_Generator_Fuel_Level | | | Generator Fuel Level | Berwick Generator |

FIG. 9

MANAGEMENT SYSTEM FOR MONITORING AND CONTROLLING REMOTE SITES AND EQUIPMENT

CROSS-REFERENCE TO RELATED APPLICATIONS

This application claims priority of U.S. provisional patent application No. 61/262,575 filed on Nov. 19, 2009, the disclosure of which is expressly incorporated herein in its entirety by reference.

STATEMENT REGARDING FEDERALLY SPONSORED RESEARCH

Not Applicable

PARTIES TO JOINT RESEARCH AGREEMENT

Not Applicable

REFERENCE TO APPENDIX

Not Applicable

FIELD OF THE INVENTION

The field of the invention generally relates to management systems for monitoring and controlling remote sites and equipment and, more specifically, relates to such systems used to monitor and control remote cell sites of wireless telecommunication networks.

BACKGROUND OF THE INVENTION

Wireless telecommunication networks typically have central management stations which manage and control a plurality of remote sites. Devices at the remote sites collect analog sensor measurements and provide that information to the central management station. For example, see U.S. Pat. Nos. 6,640,101 and 7,567,519, the disclosures of which are expressly incorporated herein in their entireties.

This information provided to the central management station from the remote sites is often limited such as, for example, to current or voltage measurements taken as analog inputs, internal temperatures, and incoming power voltages. While this information from the remote sites can provide a wealth of information about the remote sites, it does not help anticipate or resolve many problems at the remote cites. Additionally, there is an ongoing and increasing desire to reduce the number of occasions that it is necessary to send maintenance personnel to the remote sites.

Accordingly, there is a need in the art for improved management systems and methods for monitoring and controlling remote sites and equipment.

SUMMARY OF THE INVENTION

Disclosed herein are management systems and methods for monitoring and controlling remote sites and equipment which addresses one or more issues in the related art. Disclosed is a monitoring unit for a remote site comprising, in combination, a processor and memory configured to receive definitions of measurements and alarms to be collected at the remote site and to store the definitions of the measurements and alarms, a plurality of port connectors for communicating the processor with downstream collection devices that collect the measurements and alarms at the remote site, and a communication system for reporting the collected measurements and alarms to upstream systems. The definitions for the alarms and measurements can be provided from the port connections, stored script processes, and SNMP proxy. The memory is configured to automatically store a history of the measurements and alarms collected which can be exported to the upstream systems. The processor is configured to collect derived measurements not directly collected from the downstream collection devices.

Also disclosed is a method of defining measurements collected at a remote site, the method comprising the steps of, in combination, defining measurements at least in part by using identification information received directly from an external collection device, defining measurements at least in part by using identification information dynamically input by a user, and defining measurements at least in part by using an internal script using data collected from an external collection device.

Also disclosed is a method of collecting and storing measurements at a remote site, said method comprising the steps of, in combination, collecting a plurality of measurements from external collection devices at a remote site, storing a history of the plurality of measurements at the remote site for at least about 24 hours, determining and storing minimum, maximum, and average values for each of the plurality of measurements at the remote site, and detecting out of storage conditions at the remote site and deleting the oldest stored data in response to an out of storage condition.

From the foregoing disclosure and the following more detailed description of various preferred embodiments it will be apparent to those skilled in the art that the present invention provides a significant advance in the technology of management systems and methods for monitoring and controlling remote sites and equipment. Particularly, the inventions disclosed herein provide easy access to expanded information about remote sites. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

DETAILED DESCRIPTION OF CERTAIN PREFERRED EMBODIMENTS

It will be apparent to those skilled in the art, that is, to those who have knowledge or experience in this area of technology, that many uses and design variations are possible for the remote management system and methods disclosed herein. The following detailed discussion of various alternative and preferred embodiments will illustrate the general principles of the invention with regard to management of remote cell sites of wireless communication networks. Other embodiments of the present invention suitable for other applications will be apparent to those skilled in the art given the benefit of this disclosure.

Figure 1:
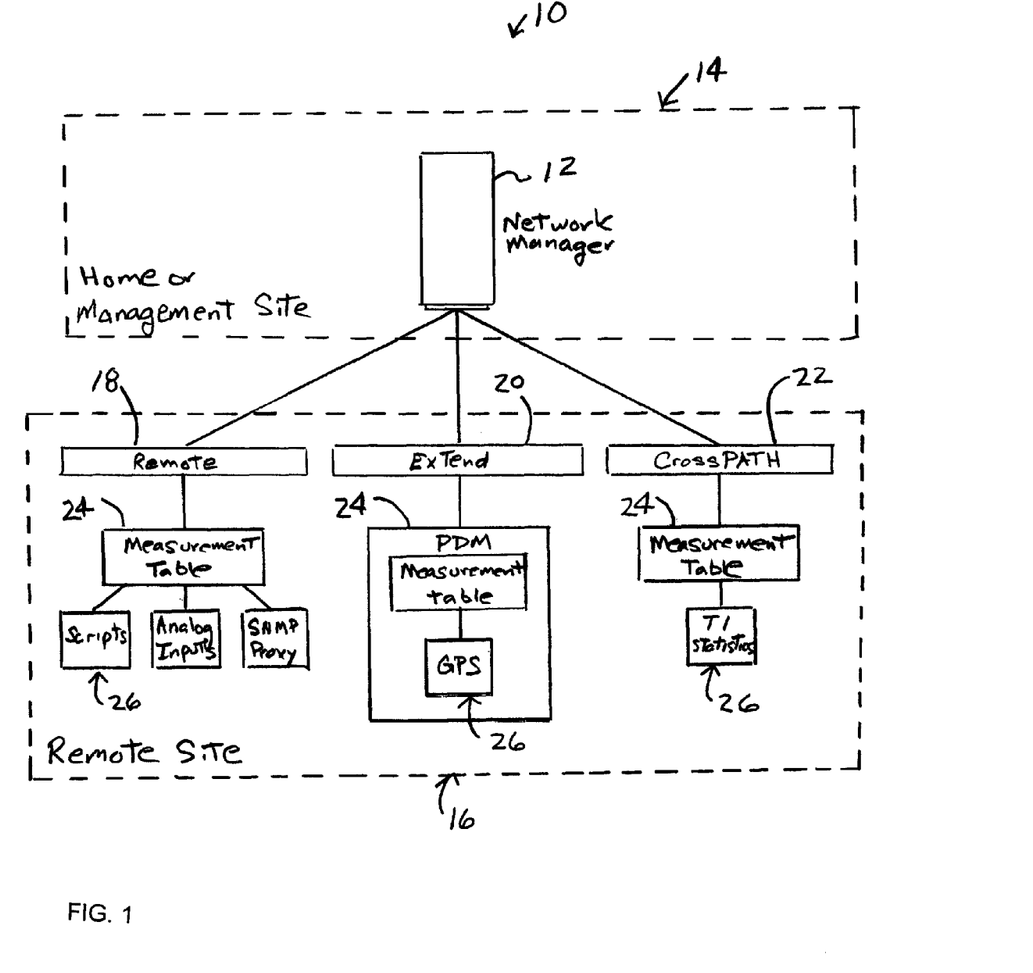
FIG. 1 is a diagrammatic view of a management system for monitoring and controlling remote sites and equipment according to the present invention.

FIG. 1 illustrates a management system 10 for remote cell sites of a wireless communication network according to the present invention. The illustrated management system 10 includes a network manager 12 located at a home or management site 14 and at least one remote site 16 typically having a tower, antenna and related equipment. It is noted that while the illustrated management system 10 shows a single remote site 16, in practice there will typically be a plurality of remote sites located over a wide area. The illustrated remote site 16 includes three monitoring units or devices 18, 20, 22 with each having a measurement table 24 managed by the same network manager 12 located at the home site 14. It is noted, however, that the remote site 16 can alternatively have any other suitable quantity of monitoring units managed by the network manager 12. The monitoring units 18, 20, 22 support different types of measurements fed from downstream sources or equipment 26 at the remote site 16 that are specific to the features of the particular monitoring unit 18, 20, 22. The illustrated remote site 16 includes a first monitoring unit 18 for providing IP management to the remote site 16, a second monitoring unit 20 for monitoring and diagnosing multi-vendor wireless repeaters and mobile network assets at the remote site 16, and a third monitoring unit 22 for managing cell site WAN access at the remote site 16. It is noted, however, that any other suitable type of monitoring units can alternatively be utilized. Some monitoring units, like the first and third illustrated monitoring units 18, 22, implement the measurement table 24 as a native component of the monitoring device. Other monitoring units, like the illustrated second monitoring unit 22, implement the measurement table 24 as an external component, e.g. a script on an extend card. The interface to the network manager 12, however, is as identical as possible across the various monitoring units 18, 20, 22.

Figure 7:
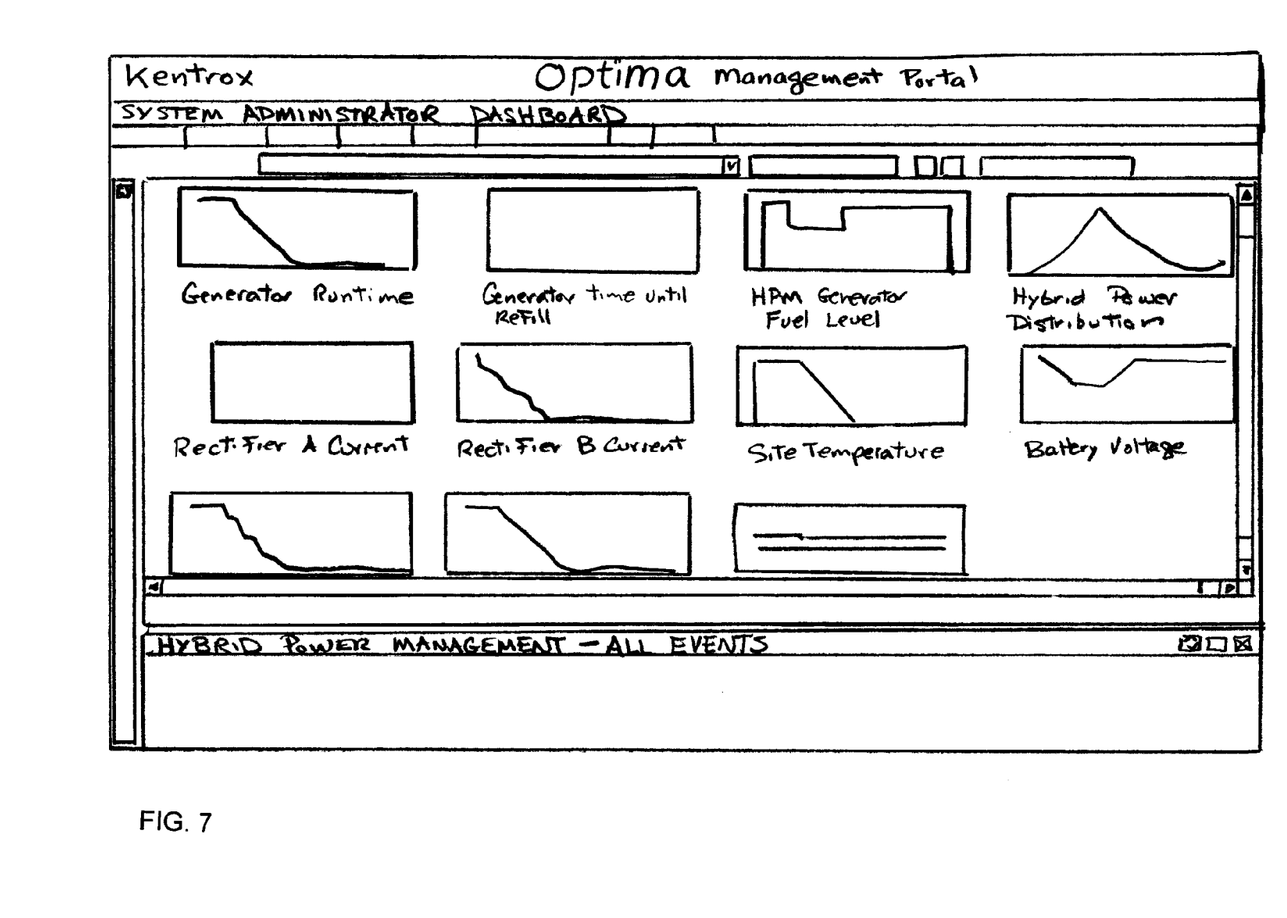
FIG. 7 is a diagrammatic view of a dashboard screen for a management portal of the system of FIG. 1.
Figure 9:
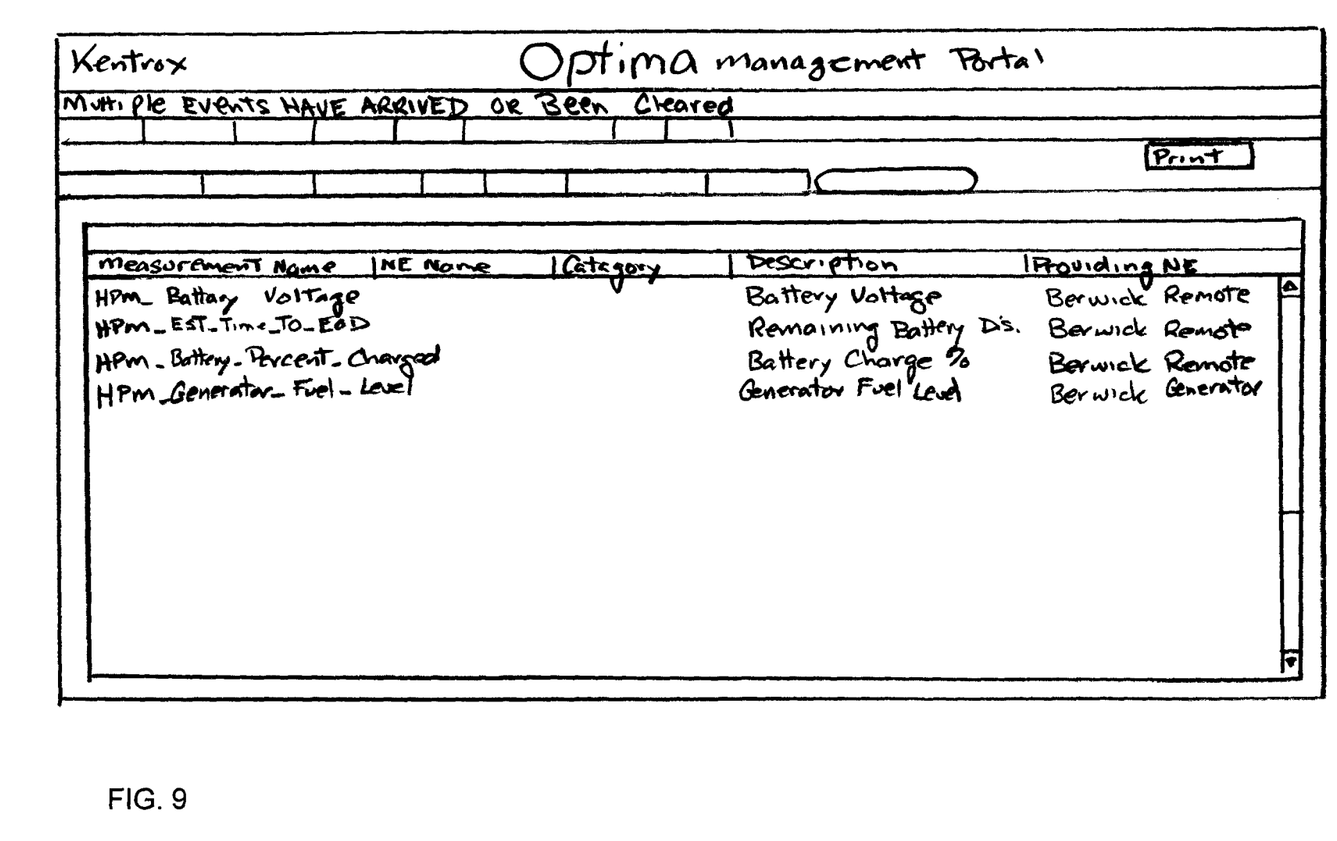
FIG. 9 is a diagrammatic view of an exemplary graphical user interface for input of the system of FIG. 1.

The network manager 12 is located at the home site 14 and includes a computer system having a processor and memory configured to perform the management functions described herein. The computer system also includes suitable bi-directional communication means for communicating with the monitoring units at the remote sites via Ethernet, T1/E1, and/or wireless communication options. Management software with a suitable user interface is operable with the computer system. The management portal can be Optima® Management Portal available from Kentrox, Inc., of Dublin, Ohio, but it is noted that any other suitable management software can alternatively be utilized. The Optima® Management Portal is a hybrid network management/element management software package used to monitor and provide management access to Kentrox, Inc. products deployed in the user's network. The management software preferably gives network operators a complete, 360 degree view and control of the remote sites 16. The management software provides preventative maintenance tools to help identify issues at the remote sites 16 before they occur. The management software also preferably provides performance reporting to enable operators to view trending and availability of the remote sites 16. Truck rolls to the remote sites 16 can be eliminated because of the remote access, diagnostics, and control capabilities in the management software. The main functions of the management software include: performance management; event management; element management; remote access; and site data collection and control. FIG. 7 shows an exemplary dashboard 28 for the management portal and FIG. 9 shows an exemplary graphical user interface 30 for input.

The illustrated monitoring units 18, 20, 22 are located at the remote site 16 and each include a processor and memory configured to receive definitions of measurements and alarms to be collected at the remote site 16 and to store the definitions of the measurements and alarms, a plurality of port connectors for communicating the processor with downstream collection devices that collect the measurements and alarms at the remote site 16, and a communication system for reporting the collected measurements and alarms to upstream systems such as the network manager 12. The definitions for the alarms and measurements can be provided from the port connections, stored script processes, and SNMP proxy. The memory is preferably configured to automatically store a history of the measurements and alarms collected which can be exported to the upstream systems such as the network manager 12. The processor is preferably configured to collect derived measurements not directly collected from the downstream collection devices 26 which are being monitored. Examples of derived measurements include fuel theft, battery life, optimal recycle period, power consumption, incomplete fueling detection, and the line. The processor is preferably configured to receive a maximum number of definitions for measurements and alarms and the maximum number can selectively be any combination of measurements and alarms. For example, if the maximum number of definitions is 20, there can be 1 to 20 measurements and 1 to 20 alarms as long as the total of measurements and alarms is not greater than 20. The processor is also preferably configured to identify the downstream collection devices 26 associated with each of the reported measurements and alarms. The processor is further preferably configured to receive identification information or definitions dynamically from a user, directly from smart downstream collection devices, and from an internal script or software process. Examples of definitions defined dynamically by a user include battery and generator run times. Examples of definitions defined by a device includes generator running. Examples of definitions defined by internal script or software includes fuel theft. FIG. 9 shows an exemplary graphical user interface 30 for input. The processor and memory are preferably configured to determine and store minimum, maximum, and average values for each of the measurements. The processor and memory are also preferably configured to detect an out of storage or memory condition and in response, to delete the oldest stored measurement data in response to the out of storage condition. The illustrated monitoring units 18, 20, 22 including the processor, port connectors, and the communication system are packaged as a single unit, that is, all packaged within a single housing or case. It is noted that alternatively, each of these functions can reside only in the first monitoring device 18 with the second and third monitoring devices 20, 22 connected thereto. Connected in this manner, the above-described processing and storage takes place only within the first monitoring device 18 from date collected by the first, second and third monitoring devices 18, 20, 22.

Figure 2:
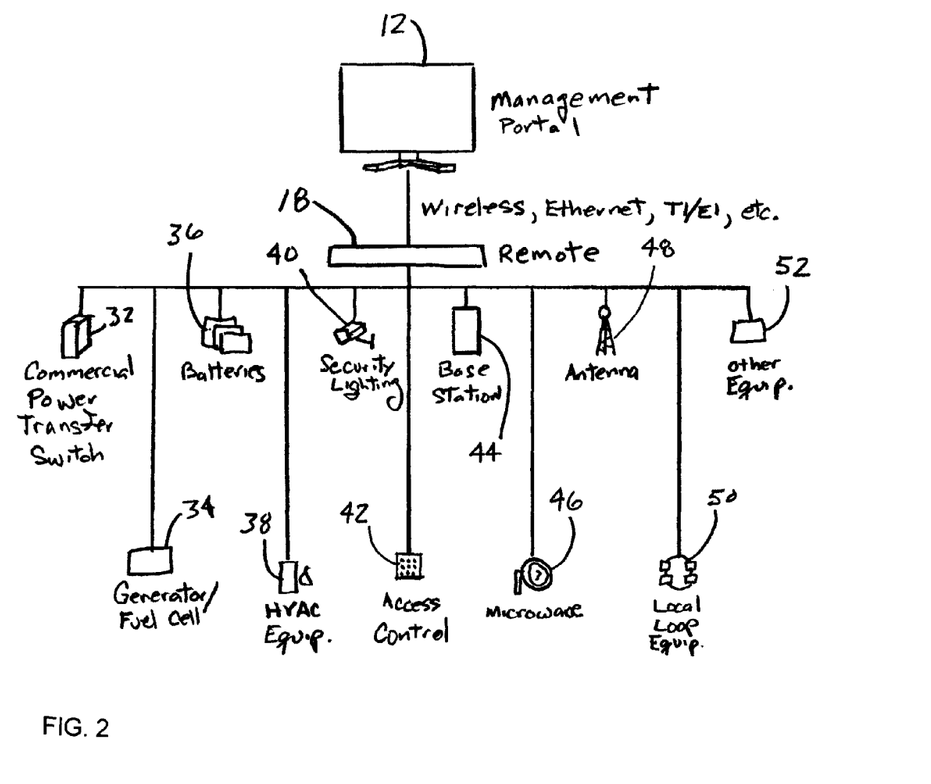
FIG. 2 is a diagrammatic view of a first remote device of the system of FIG. 1.

As best shown in FIG. 2, the first monitoring unit 18 is a monitoring and control device that provides IP management to remote sites and equipment. The first monitoring unit 18 can be a Remote Site Management Appliance (Remote) product available from Kentrox, Inc., of Dublin, Ohio, but it is noted that any other suitable monitoring device for providing IP management to remote sites can alternatively be utilized.

The Remote product provides network connectivity and data collection for a number of network devices and sensors at a remote location. The first monitoring unit 18 provides site alarm monitoring, protocol conversion, and equipment connectivity and acts as an intelligent extension of an Operations Support System (OSS). The first monitoring unit 18 enhances the network management strategy, reduces operational costs, and improves operational efficiency with reduced truck rolls to the remote site. The first monitoring unit 18 resides at the remote site 16 and connects to each desired element or piece of equipment 26 at the remote site 16 via a suitable interface. The first monitoring unit 18 performs protocol mediation and interface conversion, collects alarms and monitoring data, and supports bi-directional management control with the management portal of the network manager 14 via Ethernet, T1/E1, and/or wireless communication options. Together, the first monitoring unit 18 and the network manager 14 provide detailed monitoring, remote control, and management for virtually all of the equipment located at the remote site 16. The illustrated first monitoring device 18 is connected to downstream collection devices 26 including temperature sensors for measuring temperature readings at various locations and equipment, commercial power/transfer switches 32, generator/fuel cell controllers for measure voltage and/or strength 34, and battery strings 36 for measuring voltage and strength, HVAC equipment 38, security/lighting systems 40, access control systems 42, base station systems 44, microwave systems 46, Antenna/RET/MCPA systems 48, local loop equipment 50, and other suitable equipment and systems. It is noted, however, that the first monitoring device 18 can alternatively be connected to any other suitable downstream collection device 26.

Figure 3:
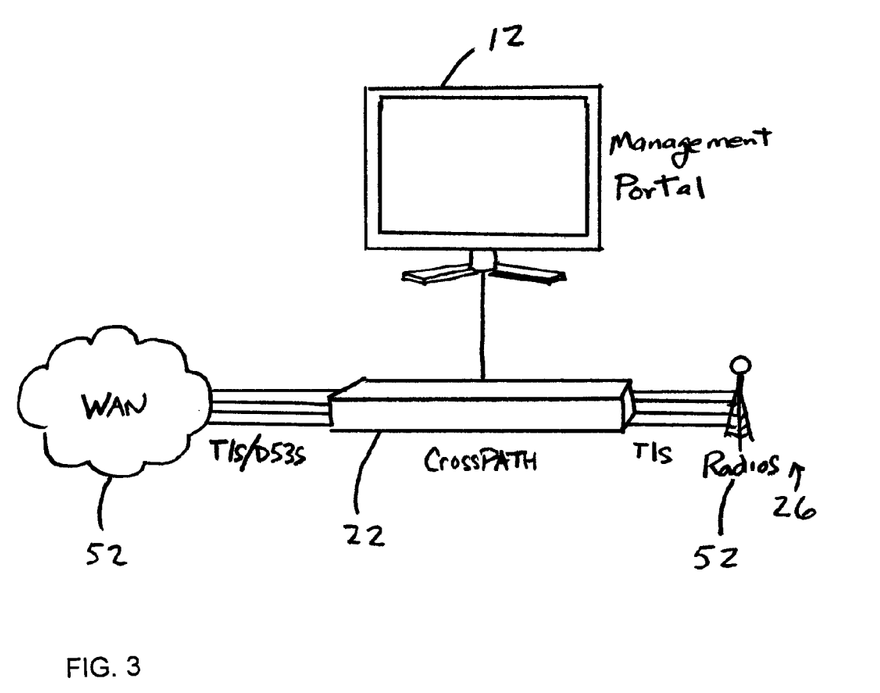
FIG. 3 is a diagrammatic view of a second remote device of the system of FIG. 1.

As best shown in FIG. 3, the third monitoring unit 22 provides high-capacity cell-site connectivity for the growth of existing networks and migration to higher densities. The third monitoring unit 22 can be a CrossPATH product available from Kentrox, Inc., of Dublin, Ohio, but it is noted that any other suitable monitoring device for managing cell site WAN access can alternatively be utilized. The third monitoring unit 22 offers extensive remote management tools that reduce on-site technician visits and improve network quality and customer satisfaction. The third monitoring unit 22 supports bi-directional management control with the management portal of the network manager 14 via Ethernet, T1/E1, and/or wireless communication options. Together, the third monitoring unit 22 and the network manager 12 provide real-time dashboard views of WAN conditions to allow telecommunication carriers to proactively diagnose and repair potential network problems at any given time, anywhere in the world—before they have an impact on subscribers and operating costs. The illustrated third monitoring device 22 is connected to downstream collection devices 26 including backhaul 52 for measuring circuit alarms and/or access circuit signal levels. It is noted, however, that the third monitoring device 22 can alternatively be connected to any other suitable downstream collection device 26.

Figure 4:
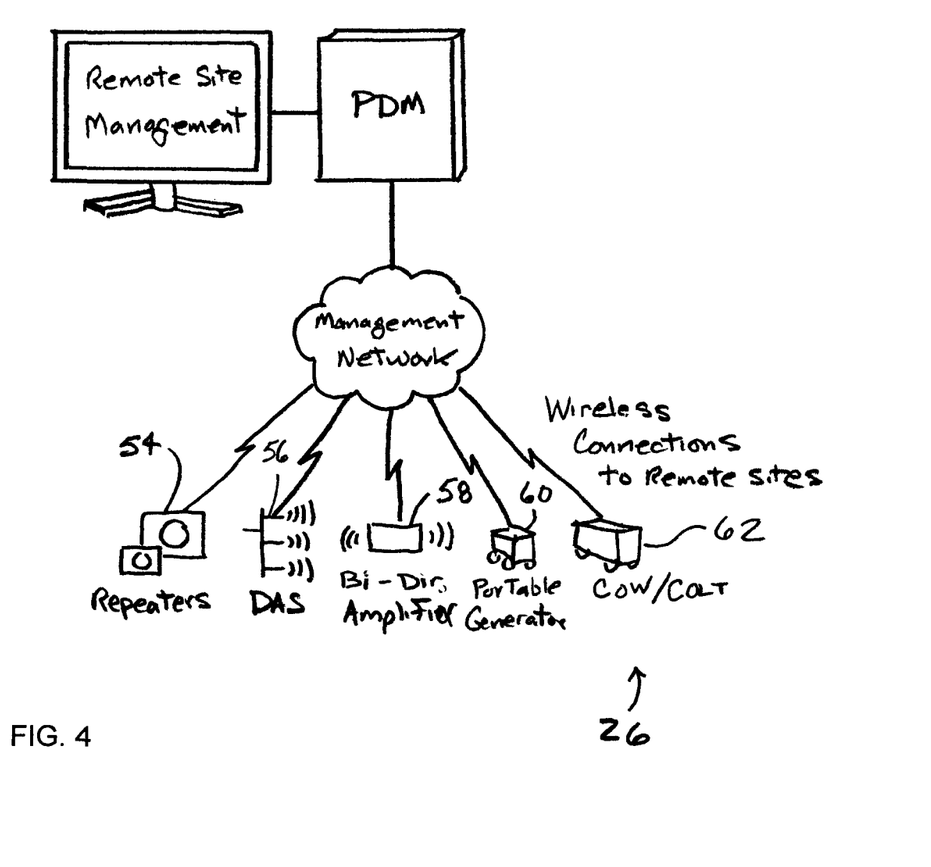
FIG. 4 is a diagrammatic view of a third remote device of the system of FIG. 1.

As best shown in FIG. 4, the second monitoring unit 20 enables service providers to monitor and diagnose multi-vendor wireless repeaters and mobile network assets to reduce network outages and mean time to repair (MTTR). The second monitoring unit 20 can be a Polled Device Monitor (PDM) product available from Kentrox, Inc., of Dublin, Ohio, but it is noted that any other suitable monitoring device for monitoring and diagnosing multi-vendor wireless repeaters and mobile network assets can alternatively be utilized. The PDM product is based on the architecture of the Remote product that provides a central monitoring service for small customer premise wireless network equipment. The second monitoring unit 20 supports bi-directional management control with the management portal of the network manager 12 via Ethernet, T1/E1, and/or wireless communication options. The second monitoring unit 20 preferably also supports mobile asset monitoring for portable generators, cell sites on wheels (COW) and cell sites on trucks (COT) which, due to mobility, often have limited network monitoring capabilities. Mobile asset monitoring enables operators to proactively manage remote assets by monitoring usage, network status, location issues and performance. The second monitoring unit can improve placement efficiencies and usage of mobile assets, as well as record keeping and reporting. The illustrated second monitoring device 20 is connected to downstream collection devices 26 including in-building repeaters 54 for reporting alarm conditions and/or uplink/downlink bytes, and distributed antenna systems (DAS) 56 for reporting temperature and/or signal strength, bi-directional amplifiers 58, portable generators 60, and COW/COLTs 62. It is noted, however, that the second monitoring device 20 can alternatively be connected to any other suitable downstream collection device 26. It is noted that the second monitoring unit 20 can be collocated with the first monitoring unit 18 at the remote site 16 or at a distant site such as the home site 14 depending on the environment and usages.

Each of the measurement tables 24 contains a plurality of measurements each identified or defined by a name and containing an analog value from some data point on the monitoring unit, units, standard NE Name and Category fields, and other properties. The measurement table 24 is presented using standard interfaces on the monitoring unit 18, 20, 22 (e.g. SNMP, CLI, or HTTP) that can be polled by the network manager 12. It may provide notifications when values change to push changes as well. The measurement table 24 maintains a history of measurement values on regular intervals such that the network manager 12 may recover information if the monitoring unit 18, 20, 22 is offline for a period of time such as, for example, due to a loss of power. The monitoring unit 18, 20, 22 preferably automatically resynchronizes upon the restoration of power after a loss of power. The history of the measurement values is preferably automatically stored for at least twenty-four hours and more preferably stored for about twenty-four hours.

Figure 5:
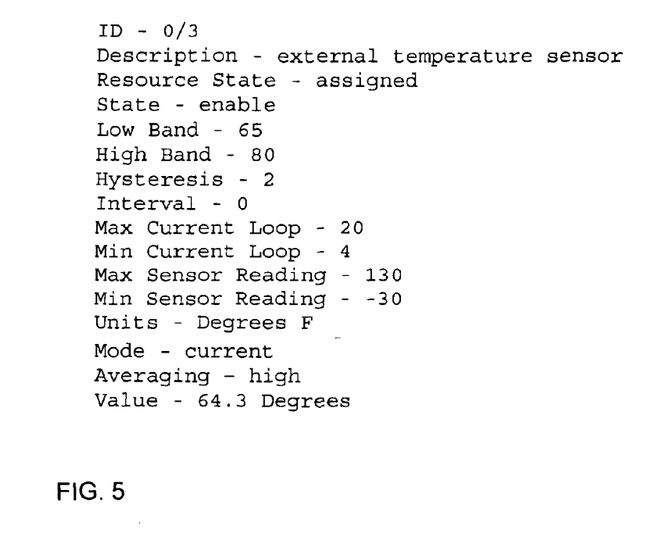
FIG. 5 is a diagrammatic view of an exemplary measurement table populated with data of the system of FIG. 1.
Figure 6:
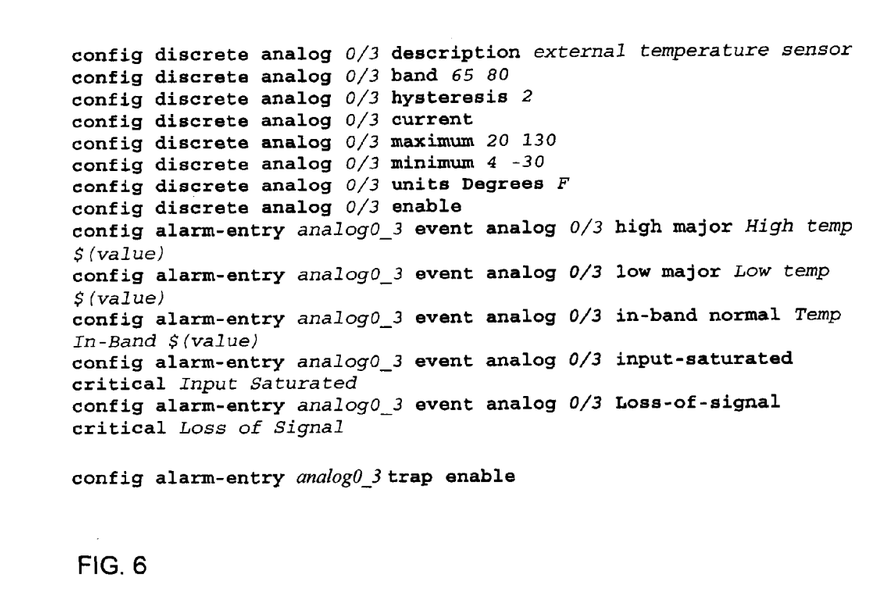
FIG. 6 is a diagrammatic view of exemplary user defined inputs for the measurement table of FIG. 5.
Figure 8:
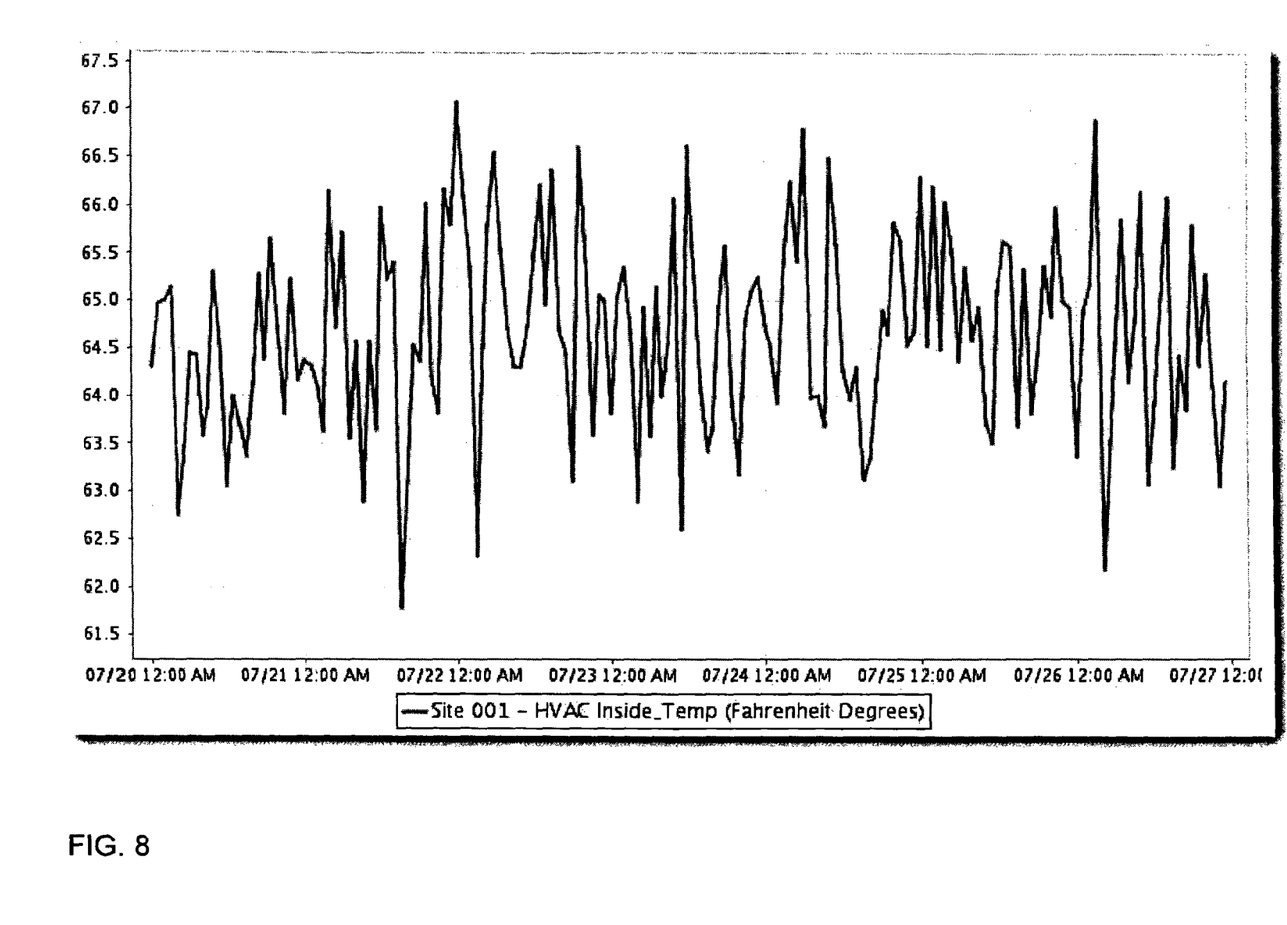
FIG. 8 is a diagrammatic view of exemplary output viewable from the system of FIG. 1.

The measurement table 24 is a set of analog value measurements identified by a unique name. FIG. 5 shows an exemplary configuration for an analog measurement from a temperature sensor. FIG. 6 shows a user defined input for the temperature sensor of FIG. 5. FIG. FIG. 8 shows exemplary output for the temperature sensor of FIGS. 5 and 6. A measurement definition preferably includes the following fields:

Name—Unique identifier of the measurement. Valid values can be alphanumeric plus underscore.

Runtime information:

Value—The current analog value of the Measurement. A floating-point value consistent with a standard 'double' data type.

Interval Value—The last value of the measurement for the previous interval

Interval Minimum—The minimum value for the measurement in the previous interval

Interval Maximum—The maximum value for the measurement in the previous interval

Interval Average—The average value for the measurement in the previous interval

State—The current state of the measurement as defined by its bands: offline, loss-of-signal, low, in-band, high, or input-saturated Configuration values:
  Originator—The identifier for the entity in the system which is producing the value. An originator can be used by multiple measurements.
  Units—The units for the measured value
  Description—The user's description of the measurement.
  NE Name—Network element name for the measurement. Used by management stations to associate measurements with other NEs.
  Category—Category of a measurement.
  Report Interval—The interval, in minutes, used to externally broadcast the current value of the measurement. A value of 0, the default, will disable notifications.
  Band threshold configuration—The hysteresis, loss of signal, low, high, and saturated configuration for determining the state and events generated by the measurement.

A measurement can generate a plurality of events or alarms. The events can contain the name, value, timestamp, and other relevant runtime information.
  Interval—The Report Interval has expired.
  Loss-of-signal—The value has lost its signal below a minimum value
  Low—The value has passed below a minimum threshold
  In-band—The value has exceeded a 'low band' threshold or passed below a 'high band' threshold
  High—The value has exceeded a maximum threshold
  Input-saturated—The value has exceeded a maximum value
  Offline—The originator of the value has gone offline and stopped producing a value
  Signal-good—The originator of the value is online and producing a value that is not too low or too high.

The measurement can be of a variety of different types of measurements. Measurements can be defined statically in the configuration of a device or managed dynamically by a user of the measurement table 24. The measurement table 24 can support a decoupled relationship between the users of the table 24 to retrieve data about a measurement and listen for events and the users which are the sources for the values of measurements and dynamic measurement entries. Readers of the measurement table 24 are able to query for information about a measurement that does not exist, that is, a measurement that is not being reported. In that case, the values returned will reflect the offline state of the measurement. Users of the measurement table 24 which add dynamic measurements have complete ownership of the entries. They are required to set all options and ensure no name conflicts exist. Statically configured measurements take precedence over dynamic measurements when a name conflict arises. Users are preferably not able to change the configuration of any measurement other than the dynamic ones they create. Users are able to read the measurement table 24 for all measurements to get the runtime information from them.

With regard to measurement updates, the configurable report interval is used to broadcast the values of the measurements to external entities, e.g. a SNMP trap. The interval is preferably a fairly long period suitable for external managers. Internally, the updates to measurements preferably occur more frequently. The interval should reflect a balance between updating in 'real-time' vs. the performance needs of updating the measurements. The updates should not cause an undue impact on system performance.

Historical measurement data export is part of a feature to collect analog sensor measurements and provide that information to central management stations. Every user configurable time interval (example: fifteen minutes, on the quarter hour), the current measurement value, the time interval minimum, maximum, and average values for each measurement are saved for preferably about 24 hours. These values provide a history of the measurements that can be used to provide measurement data for a network manager 12 if the monitoring unit 18, 20, 22 has been unavailable for polling. The historical data can be saved in flash or any other suitable type of memory so that the measurements are available even if the monitoring unit reboots. Offline measurements do not have their data saved, and there will be missing entries in the data file. The 24 hours of data collected in the data files is available for the central management stations via the ftp mechanism.

When the configured measurements and the configured time interval exceed the limit and the system is unable to provide a complete 24 hours of historical data, a trap, notifying its storage limitation, is sent to the remote management station. The device shall send the limitation clear trap when it determines that the limitation has been cleared.

The historical data retrieved from the device is formatted in CSV compressed files named meas—<time>.csv.gz. A CSV file (Comma Separated Variable File) is a file in which the ascII comma (2C) is used as the parsing value that separates significant data values in a predetermined order. The files can be compressed with a GZIP algorithm. Each line can contain the measurement values for a single measurement.

A HistoricalDataMgr is preferably responsible for taking the minimum, maximum, and average values for every measurement and writing them to persistent storage every interval of time. If the interval time is set at less than 5 minutes, then the HistoricalDataMgr writes to flash every 5 minutes. This is to take into the account for a slow network. When it is not able to collect the 24-hours of historical data due to storage space limitation, it sends out the historical data limit trap to the remote management. If the historical data limit trap is sent, it will preferably send out a historical data limit clear trap when the system can store 24 hours of historical data or more to return the system to normal condition. Preferably, about 6 Mbytes is reserved for historical measurement data. With 1.32 time gzip compression ratio and 80 bytes per entry, this flash space allows storage of a total of 2000000×(1.32)/80=33000 entries. This is equal to 24 hours of historical data for about 343 measurements collected at 15 minute intervals.

When storing the compressed CSV file, to take into account a slow network, the flash space can be split into a number of compressed CSV files with each one having a maximum of 256 kbytes compressed file size.

With regard to management interfaces, the measurement table 24 is preferably accessible via SNMP using the ktxMeasurement MIB. MIB (Management Information Base) stems from the OSI/ISO Network management model and is a type of database used to manage the devices in a communications network. The MIB provides the ktxMeasurementTable for a view of the current values of the measurements. The ktxMeasurementReport notification is sent to update the current value of a measurement if the report interval is non-zero. The ktxMeasurementReport notification will not contain the standard last trap sequence number. Users of the notification need to apply their own logic for detection of a missed update.

The CLI interface on an AIMUS device preferably provides the primary configuration of the measurement table 24. AIMUS (Applied Innovation Modular Unix System) is the name used to represent the embedded Linux Operating System ported from Linux version 2.4 by Applied Innovation, Inc. in 2002. CLI interface provides commands to configure the static entries in the table 24 under "config measurement"

and view the current values for all of the measurements under "show measurements". A brief outline of the CLI commands is given below:

config meas-table interval <interval>—Configure the interval of the historical snapshots     config meas-table entry <name>—Create or delete a Measurement         band <low><high>—Set the low and high band thresholds         category—Set the category of Measurement         description—Set the description of the Measurement         maximum—Set the maximum allowed value of the Measurement (for input-saturated state)

minimum—Set the minimum allowed value of the Measurement (for loss-of-signal state)

ne-name—Set the NE name of the Measurement         originator—Set the system originator of the Measurement         units—Set the units for the Measurement         report interval—Set the interval for providing broadcast updates of the Measurement, e.g. a SNMP trap     show meas-table—Show the measurement table history interval         entries [<name>]—Show a summary of all or filtered set of Measurements or details about a single Measurement The AIMUS HTTP interface preferably contains a page for displaying a table of the defined measurements and their runtime values.

The FTP file system on an AIMUS device preferably contains a file for retrieving the historical data for the measurement table 24.

With regard to AIMUS measurements, rosetta scripts running on an AIMUS device are preferable able to provide analog measurement values and dynamically manage entries in the table 24. The originator for the measurements can be of the form of "script <job name><measurement name>", e.g. "script pdm ne1_latitude". The measurement name field can be a unique name chosen by the job. Python scripts can utilize a Python module to interface with the measurement table 24. The module preferably provides a programmatic API that allows the script to send commands to the measurement table 24 via method calls and receive events using a listener callback. Scripts can simply provide values for measurements that are defined in the configuration. The script job can just register for the appropriate originators and produce the values. The script preferably will not be able to manage the measurement itself. The measurement will preferably be offline if the job is not running. The measurements managed by a script preferably are purely dynamic and exist only as long as the job is running. The script preferably takes complete ownership of the measurements and will preferably be required to set all options.

The first monitoring unit 18 preferably provides both originators for measurements as well as use measurements as originators for the mediation subsystem (events, alarm table, correlations, etc.). The format of a measurement originator can be "measurement <name>". The measurement table 24 preferably sends out mediation events for its defined events. The events can contain a "value" parameter with the current value of the measurement much like an analog input.

With regard to analog inputs, the first monitoring unit's on-board and expansion peripheral analog inputs preferably are originators for measurements. The originator names can be the same as for the analog input itself, e.g. "analog 7/1" or "analog 0/temperature". The analog inputs can continue to have their own threshold state and events so that existing actions, alarm table entries, and other users will preferably continue to function as before. The scaled analog input value can be the value passed to the measurement table 24. The analog inputs can provide values to the measurement table 24 only for those analogs that are enabled in the configuration and online. A disabled or offline analog input preferably causes a measurement to be offline.

The alarm table for the first monitoring unit 18 preferably uses entries in the measurement table 24 as sources of events for alarms. Measurement originators can support the point-query messages to provide correct initial state information. The SNMP Proxy feature of the Remote device can be extended to poll OIDs and create measurements from the resulting values. A separate requirements document can detail the feature and the format of its originators for the measurements. Event correlations can use measurement originators as part of their expressions. The expression may use the state of the measurement, e.g. "config correlation xyz expression measurement battVoltage low", similar to an analog input. Alternatively, the correlation can use the current value of the measurement as part of a relational operation, e.g. "config correlation xyz expression measurement battVoltage <10.2". The six standard relational operators are preferably supported: <, <=, =, >=, >, and !=. Due to rounding in floating point arithmetic, the equality and inequality operators may not always work as expected. The relational operation can be evaluated once every internal update interval for the measurement, when the measurement changes state, or when another event causes the re-evaluation of the expression. The offline state of the measurement can be reflected in the correlation evaluation.

The second monitoring unit 20 preferably supports two measurements per monitored network element for latitude and longitude. It can use originators of the form "script pdm <type>_<ne>", where the type is longitude or latitude. The name of the NE can contain underscores.

With regard to the third monitoring unit 22, if the third monitoring unit 22 supports the measurement table 24 for T1 statistics or other analog information, its implementation of the measurement table 24 is preferably consistent with AIMUS and PDM.

From the foregoing disclosure and detailed description of certain preferred embodiments, it is apparent that the measurement table 24 feature for the monitoring unit 18, 20, 22 provides a central store of analog measurement information in each unit 18, 20, 22 and that the measurement tables 24 have a common interface to management stations to facilitate the integration of the units 18, 20, 22 with the network manager 12. Examples of measurements which were previously not provided are those measurements produced by script running on the devices which may monitor an attached network element or compute additional values based on existing analog values in the device. Additionally, the SNMP proxy feature can provide measurements taken via SNMP from attached network elements and the PDM application can provide GPS coordinates for its monitored devices.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A monitoring unit for a remote site comprising, in combination:
    a processor and memory configured to receive definitions of measurements and alarms to be collected at the remote site and to store the definitions of the measurements and alarms;
    a plurality of port connectors for communicating the processor with downstream collection devices that collect the measurements and alarms at the remote site;
    a communication system for reporting the collected measurements and alarms to upstream systems;
    wherein the definitions for the alarms and measurements can be provided from the port connections, stored script processes, and SNMP proxy;
    wherein the memory is configured to automatically store a history of the measurements and alarms collected which can be exported to the upstream systems; and
    wherein the processor is configured to collect derived measurements not directly collected from the downstream collection devices; and
    wherein the definitions each include:
    i. name;
    ii. value;
    iii. minimum over an interval;
    iv. maximum over an interval;
    v. average over an interval;
    vi. current state of the measurement;
    vii. originator of the value;
    viii. unit of the measurement;
    ix. description of the measurement;
    x. network element for the measurement;
    xi. category of the measurement;
    xii. update interval; and
    xiii. band threshold.

2. The monitoring unit according to claim 1, wherein the processor, the port connectors, and the communication system are packaged as a single unit.

3. The monitoring unit according to claim 1, wherein the history of the measurements and alarms is automatically stored for at least about twenty-four hours.

4. The monitoring unit according to claim 3, wherein the history of the measurements and alarms is automatically stored for about twenty-four hours.

5. The monitoring unit according to claim 1, wherein the processor is configured to automatically resynchronize the unit upon the restoration of power after a loss of power.

6. The monitoring unit according to claim 1, wherein the processor is configured to receive a maximum number of measurements and alarms and the maximum number can selectively be any combination of measurements and alarms.

7. The monitoring unit according to claim 1, wherein the processor is configured to identify the downstream collection device associated with each of the reported measurements and alarms.

8. The monitoring unit according to claim 7, wherein the processor is configured to receive identification information from smart downstream collection devices.

9. The monitoring unit according to claim 7, wherein the processor is configured so that a user can dynamically configure identification information for the downstream collection devices.

10. The monitoring unit according to claim 7, wherein the processor is configured to determine identification information for downstream collection devices from data received from the down stream collection devices using internal script.

11. The monitoring unit according to claim 1, wherein the processor and memory are configured to determine and store minimum, maximum, and average values for each of the measurements.

12. The monitoring unit according to claim 1, wherein the processor and memory are configured to detecting out of storage conditions and deleting the oldest stored data in response to an out of storage condition.

13. The monitoring unit according to claim 1, wherein the processor and memory are configured to compress the storing data at the remote site.

14. A method of defining measurements collected at a remote site, the method comprising the steps of, in combination:
    establishing a measurement table containing a plurality of measurements, wherein each of the measurements in the measurement table has a definition including:
    i. name;
    ii. value;
    iii. minimum over an interval;
    iv. maximum over an interval;
    v. average over an interval;
    vi. current state of the measurement;
    vii. originator of the value;
    viii. unit of the measurement;
    ix. description of the measurement;
    x. network element for the measurement;
    xi. category of the measurement;
    xii. update interval; and
    xiii. band threshold;
    defining the measurements at least in part by using identification information received directly from an external collection device;
    defining the measurements at least in part by using identification information dynamically input by a user; and
    defining the measurements at least in part by using an internal script using data collected from an external collection device.

15. A method of collecting and storing measurements at a remote site, said method comprising the steps of, in combination:
    collecting a plurality of measurements from external collection devices at a remote site;
    establishing a measurement table at the remote site containing the plurality of measurements, wherein each of the measurements has a definition including:
    i. name;
    ii. value;
    iii. minimum over an interval;
    iv. maximum over an interval;
    v. average over an interval;
    vi. current state of the measurement;
    vii. originator of the value;
    viii. unit of the measurement;
    ix. description of the measurement;
    x. network element for the measurement;
    xi. category of the measurement;
    xii. update interval; and
    xiii. band threshold;
    storing a history of the plurality of measurements at the remote site for at least about 24 hours;
    detecting out of storage conditions at the remote site and deleting the oldest stored data in response to an out of storage condition.

16. The method according to claim 15, further comprising the step of compressing the storing data at the remote site.

17. The method according to claim 15, further comprising the step of storing the history of the plurality of measurements at the remote site for about 24 hours.

\* \* \* \* \*